Koch & Seachrist,
Hame Fastener.
Nº 81,650.         Patented Sep. 1, 1868.
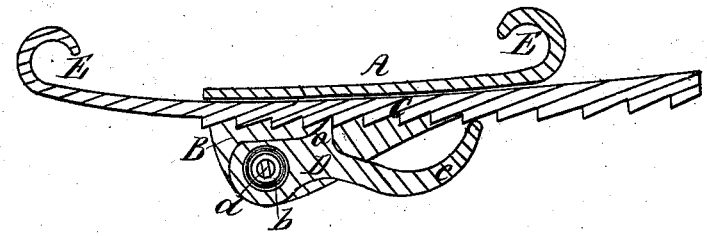
Witnesses:
Wm. A. Morgan.
Thos. Insche.
Inventor.
J. Koch.
D. Seachrist
per Murry
Attorneys.

United States Patent Office.

JOHN KOCH AND DAVID SEACHRIST, OF COLUMBIANA, OHIO.

Letters Patent No. 81,650, dated September 1, 1868.

IMPROVED HAMES-FASTENER.

*The Schedule referred to in these Letters Patent and making part of the same.*

TO ALL WHOM IT MAY CONCERN:

Be it known that we, JOHN KOCH and DAVID SEACHRIST, of Columbiana, in the county of Columbiana, and State of Ohio, have invented a new and useful Improvement in Hame-Fasteners; and we do hereby declare that the following is a full, clear, and exact description thereof, which will enable others skilled in the art to make and use the same, reference being had to the accompanying drawings, forming part of this specification, in which—

The drawing represents a central longitudinal section of our invention.

Similar letters of reference indicate like parts.

This invention is for the purpose of connecting the lower ends of hames, and for tightening the same, thus dispensing with the usual buckle and strap or simple string or thong, and supplying instead a simple, effective, and easily-operated device, by means of which harness-hames may be drawn upon the collar with the requisite degree of tightness, and fastened securely thereon.

It consists of a plate, A, bent laterally to form the lugs B, between which latter the ratchet-rack C plays to and fro with easy contact.

The ratchet-rack is held from moving in one direction by means of a pawl, D, which is actuated to bear its tooth $a$ upon the teeth of the rack by means of a concealed spiral spring, $b$, in a suitable recess in the pawl, the said spring enclosing the pivot $d$, on which the pawl vibrates.

The rack is held within the lugs by means of the pawl. The end of the rack and the end of the plate A are curved over or hook-shaped, as shown at E E, for the purpose of catching into the eyes on the lower end of hames.

When the hames are unfastened, the plate and rack are separated, each part of the fastening being attached to its respective part of the hames, but when the latter are to be fastened upon the collar, the rack is inserted into the plate, and the hames drawn together, when the pawl-tooth $a$ will catch into the teeth of the rack, and thus hold them securely fastened.

The pawl is formed with a handle-extension, $e$, by which the pawl is conveniently raised to liberate the rack from the tooth $a$ when the hames are to be unfastened or loosened by one or more teeth.

Having thus described our invention, we claim as new, and desire to secure by Letters Patent—

The pawl D, when its tooth $a$ is held against the ratchet-bar C by means of the coiled spring $b$, which is protected from injury by being concealed in a recess in the pawl around the pivot $d$, as herein shown and described.

The above specification of our invention signed by us, this 21st day of April, 1868.

JOHN KOCH,
DAVID SEACHRIST.

Witnesses:
JACOB BEARD,
THOS. CALLEN.